L. J. STILLING.
VACUUM BOTTLE.
APPLICATION FILED SEPT. 30, 1910.

1,031,884.

Patented July 9, 1912.

2 SHEETS—SHEET 1.

WITNESSES

INVENTOR
LOUIS J. STILLING
BY
his ATTORNEY

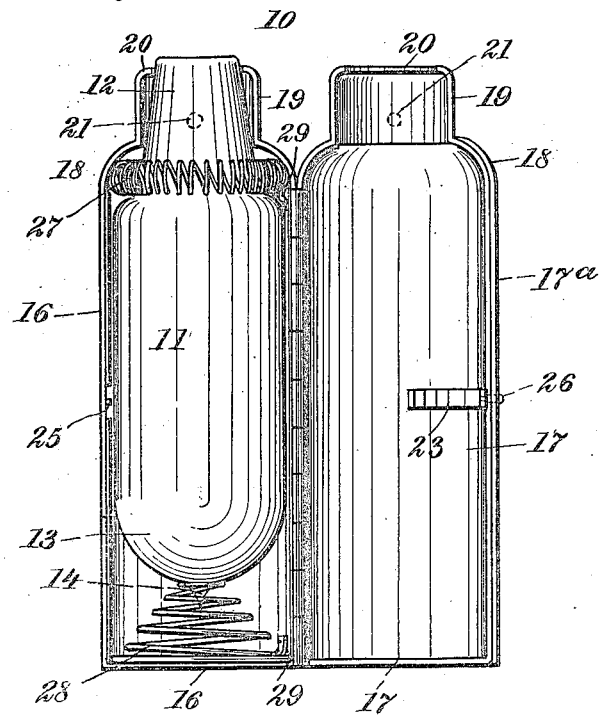
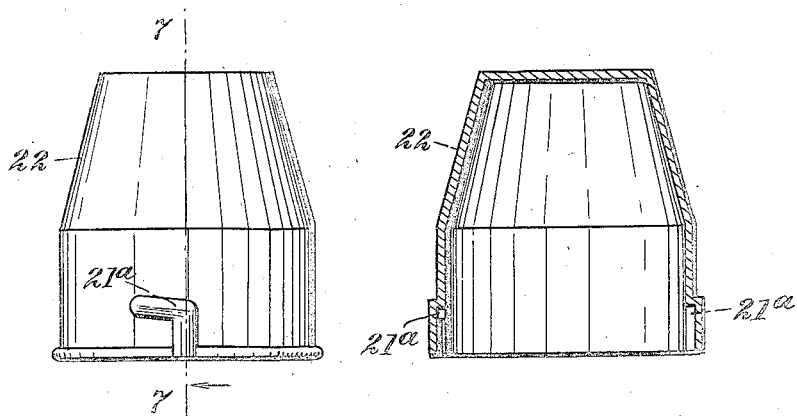

UNITED STATES PATENT OFFICE.

LOUIS J. STILLING, OF NEWARK, NEW JERSEY.

VACUUM-BOTTLE.

1,031,884.

Specification of Letters Patent.  Patented July 9, 1912.

Application filed September 30, 1910. Serial No. 584,604.

*To all whom it may concern:*

Be it known that I, LOUIS J. STILLING, a citizen of the United States, residing at Newark, Essex county, in the State of New Jersey, have invented certain new and useful Improvements in Vacuum-Bottles, of which the following is a full, clear, and exact specification.

My invention relates to improvements in means for storing foods, liquids and other fluids, and the same has for its object more particularly to provide a simple, efficient and durable portable receptacle by means of which the contents of the receptacle may be maintained without material change of temperature for considerable periods of time.

Further, said invention has for its object to provide a receptacle of the character specified comprising an inner receptacle, and an inclosing casing therefor which is so disposed about said inner receptacle that it is substantially free therefrom.

Further, said invention has for its object to provide a receptacle of the character specified in which the outer casing is formed of a plurality of parts so constructed and arranged relatively to each other that the same may be readily opened to permit of the insertion or removal of the inner receptacle.

Further, said invention has for its object to provide a receptacle of the character specified in which the inner receptacle is yieldingly supported within the outer casing and free from the walls thereof.

Further, said invention has for its object to provide a receptacle of the character specified in which the means for yieldingly supporting the inner receptacle within its inclosing casing also serves to maintain said receptacle free from contact with the walls thereof.

To the attainment of the aforesaid objects and ends, my invention consists in the novel details of construction, and in the combination, connection and arrangement of parts hereinafter more fully described, and then pointed out in the claim.

Figure 1:
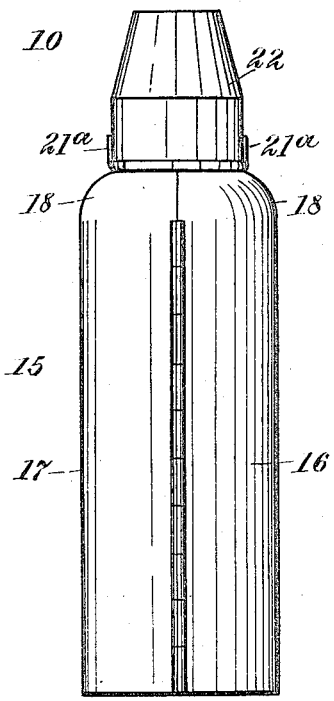
Figure 2:
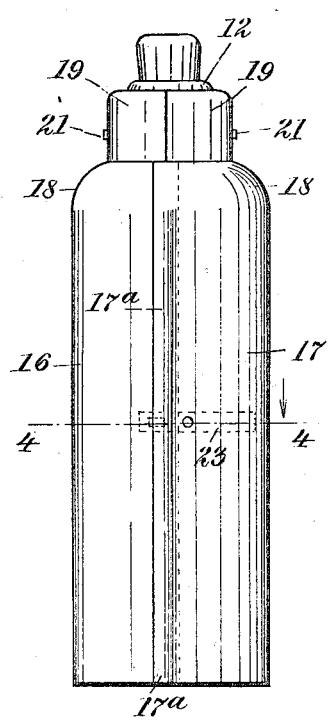
Figure 3:
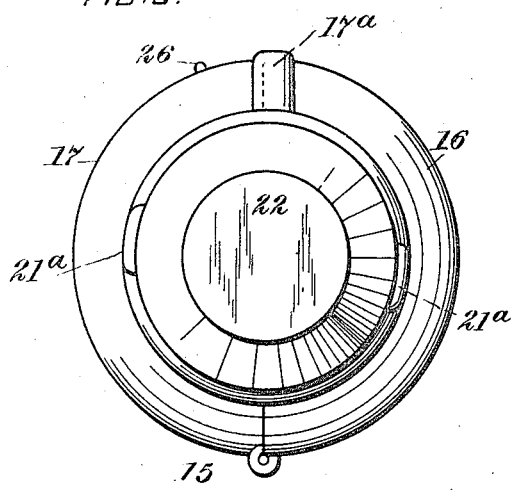
Figure 4:
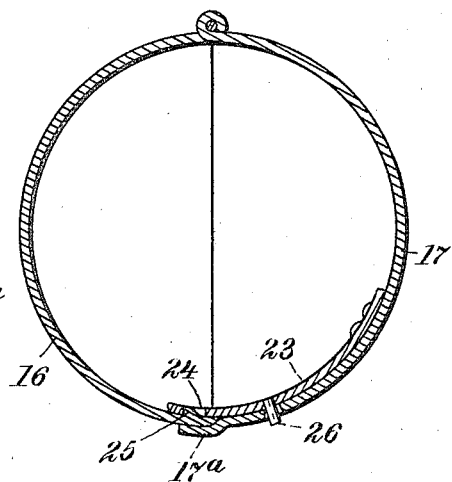

In the accompanying drawings forming part of this specification, wherein like numerals of reference indicate like parts, Figure 1 is a back view showing one form of vacuum bottle constructed according to and embodying my said invention; Fig. 2 is a front view showing the cap of the inclosing casing removed therefrom; Fig. 3 is an enlarged top view of Fig. 1; Fig. 4 is an enlarged transverse section taken on the line 4—4 of Fig. 2; Fig. 5 is a side view showing the outer casing opened to disclose the manner of supporting the double-walled inner receptacle in position therein, and Figs. 6 and 7 are respectively enlarged detail side and sectional views of the cap for closing the top of the outer casing; the latter view being taken on the line 7—7 of Fig. 6.

In said drawings 10 designates the vacuum bottle or receptacle as a whole, comprising an inner double-walled receptacle or bottle 11 of usual general construction having a tapering neck 12, and a rounded bottom 13 provided upon its underside with a centrally located depending teat or projection 14.

15 denotes a substantially cylindrical outer inclosing casing whose interior diameter and length are greater than the exterior diameter and length of the receptacle or bottle 11. The said inclosing casing 15 is composed of two parts or halves 16, 17 which are hinged together longitudinally along one edge, and provided along one of their free edges with a raised or overlapping portion 17$^a$ adapted to receive the free edge of the other part or half.

The casing parts or halves 16, 17 are provided adjacent to their upper ends with registering rounded shoulder portions 18, 18 from which extend upwardly two straight, registering neck portions 19, 19 having their upper edges turned inward to form an annular lateral flange or rim 20.

Upon the outer sides of the neck portions 19, 19 are provided outwardly extending studs 21, 21 which are adapted to be engaged by angular recesses 21$^a$, 21$^a$ formed in the opposite edges of a cap 22 and adapted to be fitted upon, and inclose the combined neck portions of said casing, 15.

23 denotes a flat curved spring having its inner end secured to the inner side of the casing half 17 about midway of its length, and its outer end projecting beyond the free edge of said casing portion 17 and provided with an aperture 24, adapted to receive an inwardly extending projection 25 upon the inner side of the casing half 16 when said parts 16 and 17 are brought together.

26 denotes a stud secured to the spring 23 adjacent to its free end which stud extends through an aperture in the casing half 17, and serves as a means for releasing the spring 23 of its engagement with the projection 25 in order to open the casing 15.

27 denotes a spiral annulus arranged in the upper end of the casing 15 and contacting with the shoulder portions 18, 18 thereof, and 28 denotes a helical tapering spring supported upon the base of the casing 15 having its upper end bearing against the rounded lower end of the inner receptacle 11, and surrounding the projection 14 thereon. The spring 28 serves to yieldingly support the receptacle 11 within the casing 15 free from the bottom thereof, and at the same time maintain the shoulder of the receptacle 11 in contact with the spiral annulus 27 so as to be free from the shoulder 18 of the casing 15.

In order to removably support the annulus 27, and spring 28 in position with the casing 15 I preferably provide short clips or retaining members 29, 29. However, any other suitable means may be employed to this end.

It will be noted that by means of the construction herein shown and described, I am enabled to provide a double-walled receptacle with an inclosing casing therefor which may be readily opened to permit of the removal of said inner or double-walled receptacle for claiming or replacing the same with another. Further, it will be noted that by yieldingly supporting the inner double-wall receptacle within its outer inclosing casing, the danger of breaking or injuring said inner receptacle is reduced to a minimum.

Having thus described my invention what I claim and desire to secure by Letters Patent, is:

A receptacle of the character described, comprising an outer casing formed of two corresponding parts, or halves, means for securing said parts or halves together, an inner, double-walled vessel disposed within said casing having a neck at its upper end extending through said casing, and a projection at its lower end, an annular spiral spring arranged within said casing adjacent to its upper end adapted to receive the neck of said inner vessel, and a helical spring disposed in the base of said casing adapted to engage the base of said inner vessel, and the projection thereon whereby to hold said inner vessel in position within said outer casing free from the walls thereof, and the upper end of said inner vessel in engagement with said annular spiral spring, substantially as specified.

Signed at the city of New York, in the county and State of New York, this twenty-sixth day of September, 1910.

LOUIS J. STILLING.

Witnesses:
CONRAD A. DIETERICH,
FRED. H. DECKER.